Dec. 10, 1935.　　　　　G. WALKER　　　　　2,023,864
SCALE
Filed Sept. 18, 1929　　　　2 Sheets-Sheet 1

INVENTOR.
George Walker.
BY Duell, Dunn & Anderson
ATTORNEYS.

Dec. 10, 1935.                G. WALKER                2,023,864
                                SCALE
                        Filed Sept. 18, 1929            2 Sheets-Sheet 2

INVENTOR.
George Walker.
BY
Duell, Dunn & Anderson
ATTORNEYS.

Patented Dec. 10, 1935

2,023,864

UNITED STATES PATENT OFFICE 2,023,864

SCALE

George Walker, Brooklyn, N. Y., assignor to The Jacobs Bros. Co. Inc., Brooklyn, N. Y., a corporation of New York Application September 18, 1929, Serial No. 393,349

7 Claims. (Cl. 265—69)

This invention relates to a scale having functionally and structurally improved characteristics.

While the improvements embodied in the present invention are capable of wide application throughout the scale art, it is primarily intended that they be utilized in conjunction with scales of the types shown for example in the United States patents to Priddy No. 1,205,564, issued November 21, 1916, and Strubler No. 1,296,710, issued March 11, 1919. In such connections, the present invention aims to provide structures by means of which the scales will function with a greater degree of accuracy than heretofore.

A further object of the invention is that of providing an improved load-supporting and weight-resisting structure which may be accurately assembled and tested, and which, in use, will be free from mechanical defects resulting in inaccuracies of weight-registration.

A further object of the invention is that of furnishing an apparatus of this nature in which the load-resisting factor may preferably be in the nature of a resilient element, and in which difficulties in connection with differentials of temperatures will be avoided.

A further object is that of providing a scale with which a registering mechanism is preferably associated according to the teachings of the Strubler patent aforementioned and in which the registering mechanism may be shifted and locked without the weighing parts being subjected to movement with consequent strain.

A still further object is that of providing a scale embodying, among others, the several features aforementioned and in which the accomplishment of such results is predicated upon a structure involving relatively few and rugged parts, capable of being readily manufactured and assembled, and which, when assembled, will operate over long periods of time with freedom from difficulty.

With these and further objects in mind, reference is had to the attached sheets of drawings illustrating one practical embodiment of the invention, and in which:—

Figure 2:
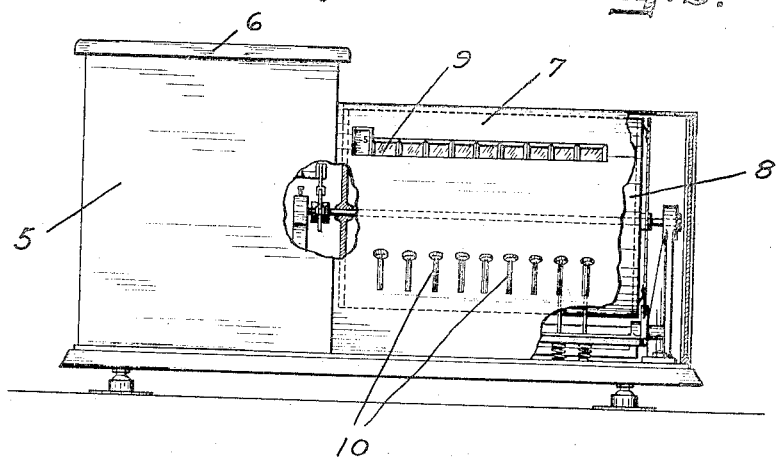
Fig. 2 is a partly fragmentary front elevation of the entire scale.
Figure 3:
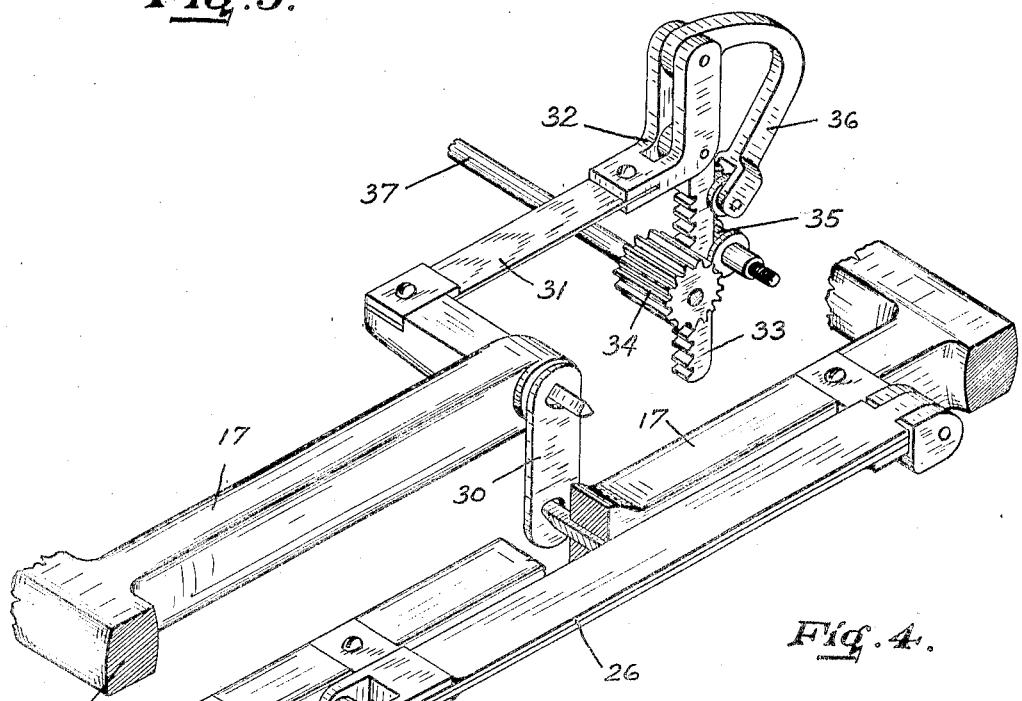
Fig. 3 is an enlarged perspective view of certain of the parts as shown in Fig. 1.

With primary reference to Fig. 2, it will be noted that the numeral 5 indicates a main casing above which a load-receiving platform 6 is positioned. The casing 5 is provided with an extension 7 within which a cylinder 8 is rotatably mounted, the latter bearing upon its face indicia indicative of the load or thrust upon the platform as well as further indicia showing for example the value of postage to be placed upon an article being weighed, and such indicia being subdivided for view through the series of openings 9 so that the postal charges in various zones may be instantly determined.

The foregoing has been shown in detail in the Strubler patent previously referred to. In this patent, there are also shown a series of keys corresponding to those at 10 and by means of which any one of the openings 9 may be uncovered in order to view the underlying indicia upon the drum. The pressing of any one of these keys also serves—by means of a suitable mechanism—to "frame" a portion of indicia. In other words, if the platform is in such position that the drum has been rotated to a point at which only a portion of one of its sub-divisions is visible through that opening which has been uncovered, the drum will be shifted to a point at which the sub-division is accurately aligned with the opening. Difficulty has heretofore been experienced in this connection incident to the fact that by deliberately turning the drum to assure such registration, damage to the parts or their adjustment was likely to result.

Figure 1:
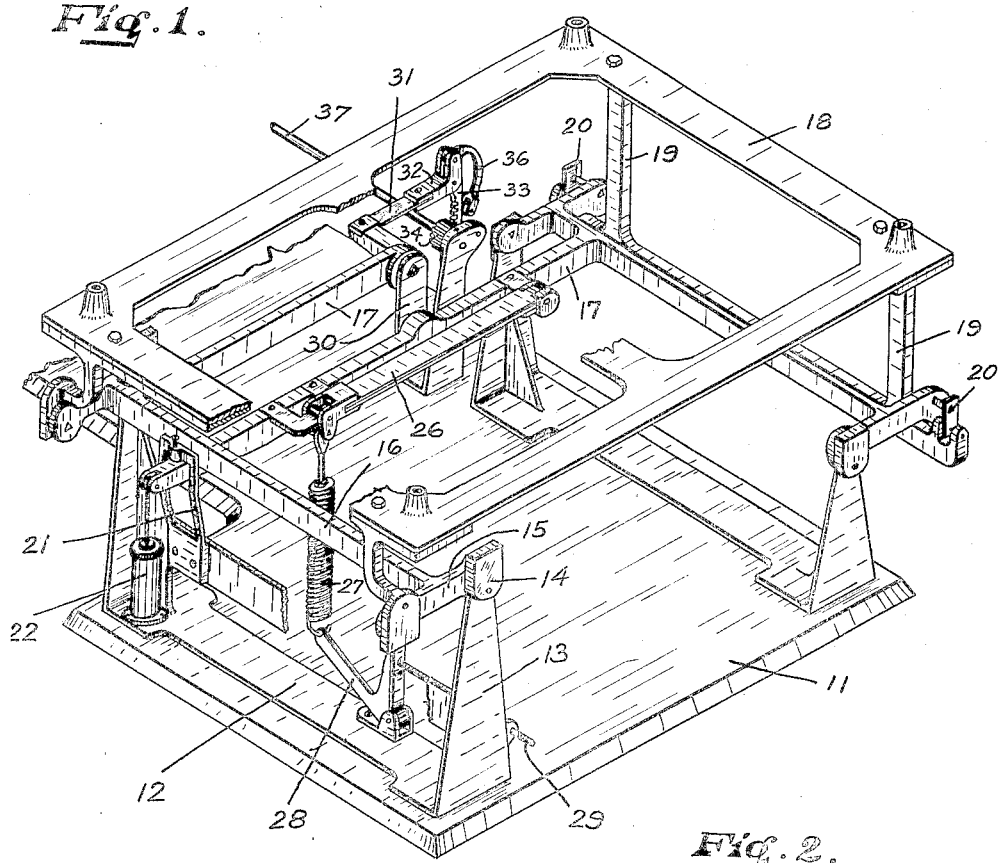
Fig. 1 is a perspective view of the load-supporting and resisting structures in the scale.
Figure 4:
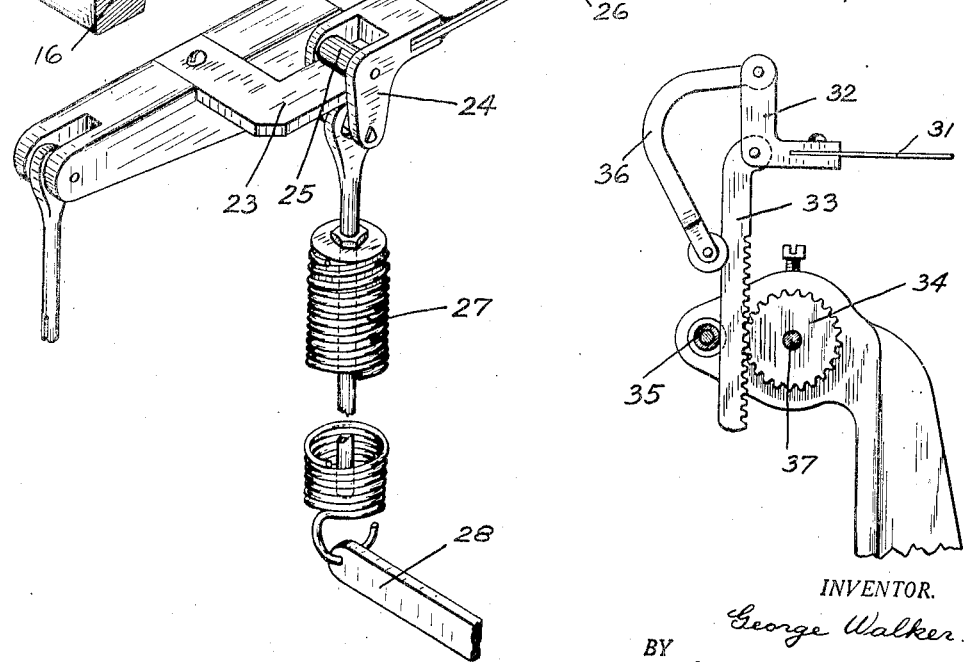
Fig. 4 is a fragmentary side elevation of certain of the parts as shown in Fig. 3.

Now referring to the detailed structure of the mechanism illustrated in Figs. 1, 2 and 4, it will be noted that the numeral 11 indicates a base upon which strips 12 are transversely mounted. The ends of these strips extend upwardly to provide supports 13 which, at their upper ends by means of suitable bearings 14, support the inner ends of levers 15. These levers are connected by cross bars 16, each of which in turn carries an arm 17. A platform support 18 is connected by uprights 19 and bearings 20 to the outer ends of the levers 15 and it will accordingly be obvious that by transmitting a load to the platform support, the latter will cause the levers 15 to be rocked, resulting in the arm 17 being moved upwardly. One of these arms passes through a guide 21 and at a point beyond the same is coupled to a dash pot 22. This lever also carries a support 23 which may be in the nature of a flat strip, and upon this support a traveler 24 has movement, preferably by means of a roller 25. This traveler is connected by a thermostat 26 to the arm 17, it being appreciated that the weight of the traveler is also borne by this arm through the medium of the support 23. Coupled to the lower end of the traveler is a coil spring 27, the lower end of which is preferably carried by the inner arm of a bell-crank lever 28. This latter lever is pivotally mounted upon the base and the lever may be rocked by means of an adjusting screw 29.

It is obvious that as the resistance factor offered by the spring 27 varies incident to climatic conditions, the traveler will be shifted along the support 23 by virtue of the thermostatic strips or unit being bowed to a greater or lesser extent. Such shifting will obviously cause a shifting of the upper end of the spring towards or away from the point of pivotal support of the arm, and it will thus be obvious that if the thermostatic structure is correlated to the resistance offered by the spring, that the weight value registration will at all times be accurate despite heat variations.

The second arm 17 is preferably coupled to the first arm by means of a link 30 and at its outer end this arm carries a resilient flexion strip 31 supporting a bracket 32 which carries a rack 33, the teeth of which mesh with a pinion 34. Constant engagement between these teeth is at all times assured, as for example by providing a roller 35, and with a view to avoiding friction in this connection, the bracket may also support a rockingly mounted lever 36 which bears against the rack to assure just the required intimacy of contact between the rack and pinion teeth.

The pinion is carried by a shaft 37 which may correspond to the shaft 60 of the Strubler disclosure, and thus, as the arm is rocked incident to the imposition of a load upon the platform, this shaft will be turned. However, due to the flexion strip 31 or its equivalent, it will be obvious that if the shaft 37 is rotated incident—for example—to a shifting of one of the keys 10, that no damage will result. More particularly, a partial turning of the pinion will cause a movement of the rack but this movement will not result in forcing movement of the arm 17 for the reason that the strip 31 will flex to prevent this occurring.

In operation with the parts assembled in the manner shown, it will be appreciated that with a load imposed upon the platform, in turn carried by the support 18, both of the outer ends of the two levers 17 will be moved upwardly and this movement will be increasingly resisted incident to the spring 27. The registering factor of such resistance will at all times be equal incident to the shifting of the upper end of the spring in the event of temperature variations. The movement of the arms permitted by the spring will result in an operating of the shaft 37, and as afore explained, a slight shifting of this shaft will not have a harmful result on the mechanism.

From the foregoing, it will be appreciated that, among others, the several objects specifically aforementioned will be achieved. It will, moreover, be understood that numerous changes in construction and rearrangements of the parts might be resorted to without departing from the spirit of the invention as defined by the claims.

Having described my invention, what I claim as new and desire to secure by Letters Patent, is:

1. A scale including, in combination, a base, a load-supporting member, means for movably mounting said member upon said base, an arm connected to said member and to be moved in response to the movements of the latter with respect to said base, a register operating mechanism, a rack rockingly carried by said arm, a pinion associated with said mechanism and having its teeth engaging the teeth of said rack, and a lever movable with said arm and bearing against said rack to assure meshing of the latter and said pinion.

2. A scale including, in combination, a base, a load-supporting member, means for movably mounting said member upon said base, an arm connected to said member and to be moved in response to the movements of the latter with respect to said base, a register operating mechanism, a rack rockingly carried by said arm, a pinion associated with said registering mechanism and having its teeth engaging the teeth of said rack, and a lever bearing against said rack to assure meshing of the latter and said pinion, said lever being rockingly supported by said arm and mounted above the same.

3. A scale including, in combination, a base, a load supporting member, levers rockingly mounted at one of their ends by said base, said member being likewise mounted substantially adjacent the opposite ends of said levers, an arm coupled to one of said levers and moving in response to the rocking of the latter, a carriage supported by said arm and shiftable along the same, a thermostatic element coupled to said carriage and said arm for effecting such shifting, and a spring having one of its ends secured to said carriage, its opposite end being connected to said base.

4. A scale including, in combination, a base, a load supporting member, levers rockingly mounted at one of their ends by said base, said member being likewise mounted substantially adjacent the opposite ends of said levers, an arm coupled to one of said levers and moving in response to the rocking of the latter, a track member supported by said arm, a carriage movable along said track member, a thermal element having one of its ends secured to said carriage and its opposite end coupled to said arm, and a spring connected at one of its ends to said base and at its opposite end to said carriage.

5. A scale including, in combination, a load supporting element, a base, levers rockingly mounted on said base and actuated by the load supporting element, arms attached to and extending inwardly from the levers, a thermostatically regulated movement resisting means attached to one of said arms, a register operating device means for operatively connecting said device with the other of said arms, said connection including a flexion strip so as to permit shifting of the operating device without disturbing the position of the load supporting element.

6. A scale including a base, supports extending upwardly from said base, beams rockingly mounted upon said supports and extending outwardly therefrom, a platform rockingly mounted by and adjacent the outer ends of said beams, arms connected to and extending inwardly from said beams, means for rockingly connecting said arms, a spring connected to one of said arms and adjacent its outer end, a yielding member adjacent the outer end of the second arm, and a register operating mechanism secured to the outer end of said member.

7. A scale including a base, supports extending upwardly from said base, beams rockingly mounted upon said supports and extending outwardly therefrom, a platform rockingly mounted by and adjacent the outer ends of said beams, arms connected to and extending inwardly from said beams, means for rockingly connecting said arms, a spring disposed adjacent the outer end of one of said arms, means for shiftably connecting such spring and arm, thermostatic means for shifting the spring longitudinally of the arm, and a register operating mechanism connected to the outer end of the second arm.

GEORGE WALKER.